United States Patent
Rizzo et al.

(10) Patent No.: US 10,876,518 B2
(45) Date of Patent: Dec. 29, 2020

(54) SYSTEM AND METHOD FOR MITIGATING DAMAGE IN A ROTOR BLADE OF A WIND TURBINE

(71) Applicant: General Electric Company, Schenectady, NY (US)

(72) Inventors: Michael James Rizzo, Rotterdam, NY (US); John Joseph Mihok, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 16/382,416

(22) Filed: Apr. 12, 2019

(65) Prior Publication Data

US 2020/0325875 A1 Oct. 15, 2020

(51) Int. Cl.
*F03D 7/04* (2006.01)
*F03D 7/02* (2006.01)
(Continued)

(52) U.S. Cl.
CPC .............. *F03D 7/048* (2013.01); *F03D 1/06* (2013.01); *F03D 7/0224* (2013.01); *F03D 17/00* (2016.05);
(Continued)

(58) Field of Classification Search
CPC .......... F03D 1/06; F03D 7/0224; F03D 7/048; F03D 17/00; F05B 2270/1011;
(Continued)

(56) References Cited

U.S. PATENT DOCUMENTS

| | | |
|---|---|---|
| 8,161,822 B2 | 4/2012 | Volanthen |
| 8,177,505 B2 | 5/2012 | Scholte-Wassink |
| | (Continued) | |

FOREIGN PATENT DOCUMENTS

| | | |
|---|---|---|
| CN | 107061185 | 8/2017 |
| CN | 107781118 | 3/2018 |
| | (Continued) | |

OTHER PUBLICATIONS

European Search Report, dated Sep. 7, 2020 for EP Application No. 20167775.4.

*Primary Examiner* — Igor Kershteyn
(74) *Attorney, Agent, or Firm* — Dority & Manning, P.A.

(57) ABSTRACT

A method for mitigating damage in a rotor blade of a plurality of rotor blades of a wind turbine includes receiving a plurality of acceleration signals from the plurality of the rotor blades in at least one direction. The method also includes generating a spectral density for each of the plurality of acceleration signals. Further, the method includes determining blade energies for each of the plurality of rotor blades based on the spectral densities for each of the plurality of acceleration signals for at least one predetermined frequency range. Moreover, the method includes comparing the blade energies to at least one of each other or a predetermined damage threshold. In addition, the method includes implementing a control action when one or more of the blade energies vary from each other by a predetermined amount or one or more of the blade energies exceed the predetermined damage threshold.

20 Claims, 7 Drawing Sheets

(51) Int. Cl.
   *F03D 1/06* (2006.01)
   *F03D 17/00* (2016.01)

(52) U.S. Cl.
   CPC . *F05B 2270/102* (2013.01); *F05B 2270/1011* (2013.01); *F05B 2270/32* (2013.01); *F05B 2270/327* (2013.01); *F05B 2270/402* (2013.01); *F05B 2270/807* (2013.01)

(58) Field of Classification Search
   CPC ............ F05B 2270/102; F05B 2270/32; F05B 2270/327; F05B 2270/402; F05B 2270/807
   See application file for complete search history.

(56) References Cited

U.S. PATENT DOCUMENTS

| | | | |
|---|---|---|---|
| 8,605,263 B2 | 12/2013 | Criado Abad et al. | |
| 9,255,886 B2 | 2/2016 | Glavind et al. | |
| 9,523,354 B2 | 12/2016 | Olesen | |
| 2007/0018457 A1* | 1/2007 | Llorente Gonzalez | F03D 7/028 290/44 |
| 2009/0319199 A1 | 12/2009 | Volkmer | |
| 2011/0125419 A1* | 5/2011 | Bechhoefer | F03D 17/00 702/34 |
| 2011/0285129 A1 | 11/2011 | Li et al. | |
| 2013/0099497 A1* | 4/2013 | Bowyer | F03D 7/042 290/44 |
| 2014/0241878 A1* | 8/2014 | Herrig | F03D 7/00 416/1 |
| 2015/0132130 A1* | 5/2015 | Brown | F03D 7/022 416/43 |
| 2016/0245262 A1 | 8/2016 | Ide et al. | |
| 2017/0058870 A1* | 3/2017 | Bertolotti | F03D 7/0224 |
| 2017/0328349 A1* | 11/2017 | Pan | F03D 17/00 |
| 2017/0335828 A1* | 11/2017 | Muller | F03D 17/00 |
| 2019/0154001 A1* | 5/2019 | Ostergaard | F03D 7/042 |
| 2019/0383266 A1* | 12/2019 | Vaughn | F03D 7/0224 |

FOREIGN PATENT DOCUMENTS

| | | |
|---|---|---|
| DE | 10065314 | 7/2002 |
| EP | 1075600 | 2/2001 |

\* cited by examiner

SYSTEM AND METHOD FOR MITIGATING DAMAGE IN A ROTOR BLADE OF A WIND TURBINE

FIELD

The present disclosure relates in general to wind turbines, and more particularly to systems and methods for mitigating damage in a rotor blade of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. More specifically, in many wind turbines, the gearbox is mounted to the bedplate via one or more torque arms or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During their lifecycle, the rotor blades may be subjected to various conditions that cause blade damage. For example, during wind turbine operation, the rotor blades may be excessively loaded due to various operating and/or environmental conditions and/or the rotor blades may include various stress points due to manufacturing defects. Regardless of what causes the damage, localized stress concentrations may develop into cracks, which can spread quickly and eventually lead to blade failure. In a worst-case scenario, a catastrophic blade failure may necessitate the tower, or even the entire wind turbine, to be replaced.

In view of the aforementioned, the art is continuously seeking new and improved systems and methods for detecting and mitigating rotor blade damage.

BRIEF DESCRIPTION

Aspects and advantages of the invention will be set forth in part in the following description, or may be obvious from the description, or may be learned through practice of the invention.

In one aspect, the present disclosure is directed to a method for mitigating damage in a rotor blade of a plurality of rotor blades of a wind turbine. The method includes receiving, via a controller, a plurality of acceleration signals from the plurality of the rotor blades in at least one direction. The method also includes generating, via the controller, a spectral density for each of the plurality of acceleration signals. Further, the method includes determining, via the controller, blade energies for each of the plurality of rotor blades based on the spectral densities for each of the plurality of acceleration signals for at least one predetermined frequency range. Moreover, the method includes comparing the blade energies to at least one of each other or a predetermined damage threshold. In addition, the method includes implementing a control action when one or more of the blade energies vary from each other by a predetermined amount or one or more of the blade energies exceed the predetermined damage threshold.

In one embodiment, for example, the plurality of acceleration signals may be generated by respective pitch systems of the plurality of rotor blades. In another embodiment, the direction(s) may include a Z-direction in terms of gravity.

In further embodiments, the method may include determining the at least one predetermined frequency range based on a power output of the wind turbine, rotor blade type, wind turbine type, and/or an angle of one or more of the plurality of rotor blades. As such, as the power output increases, the predetermined damage threshold increases.

In additional embodiments, determining the blade energies for each of the plurality of rotor blades may include determining an area under a curve of the spectral densities for each of the plurality of acceleration signals for the at least one predetermined frequency range.

More specifically, in one embodiment, the predetermined frequency range(s) may include a plurality of predetermined frequency ranges. For example, in such embodiments, the plurality of predetermined frequency ranges may include a first frequency range of from about 25 Hertz (Hz) to about 30 Hz and a second frequency range from about 35 Hz to about 40 Hz. In such embodiments, determining the area under the curve of the spectral densities for each of the plurality of acceleration signals for the plurality of predetermined frequency ranges may include determining the area under the curve of the spectral densities for a logarithm of each of the plurality of acceleration signals for the plurality of predetermined frequency ranges.

In yet another embodiment, the method may include determining the area under the curve of the spectral densities for the logarithm of each of the plurality of acceleration signals for the plurality of predetermined frequency ranges using Simpson's rule.

In still another embodiment, the method may include determining the area under the curve of the spectral densities for each of the plurality of acceleration signals for the predetermined frequency range for a training time period so as to determine a healthy blade threshold as a baseline for each of the plurality of rotor blades.

In certain embodiments, determining the blade energies for each of the plurality of rotor blades based on the spectral densities for each of the plurality of acceleration signals for at least one predetermined frequency range may include determining a maximum value and a minimum value of the area under the curve of the spectral densities for each of the plurality of acceleration signals for the at least one predetermined frequency range and determining a difference between the maximum value and the minimum value for each of the plurality of acceleration signals.

In such embodiments, comparing the blade energies to at least one of each other or a predetermined damage threshold may include comparing each of the differences between the maximum value and the minimum value for each of the plurality of acceleration signals to the predetermined damage threshold.

In another embodiment, the spectral density for each of the plurality of acceleration signals may correspond to a power spectral density. Therefore, in certain embodiments, the method may include determining the power spectral density for each of the plurality of acceleration signals further comprises utilizing Welch's method.

In particular embodiments, the control action may include, for example, generating an alarm or notification signal, shutting down the wind turbine, and/or derating the wind turbine.

In another aspect, the present disclosure is directed to a system for mitigating damage in a rotor blade of a plurality of rotor blades of a wind turbine. The system includes a pitch system communicatively coupled to each of the plurality of rotor blades. Each of the pitch systems may generate a plurality of acceleration signals. The system further includes a controller comprising at least one processor. The processor(s) is configured to perform a plurality of operations, including but not limited to receiving the plurality of acceleration signals from the pitch systems, determining blade energies for each of the plurality of rotor blades based the plurality of acceleration signals for at least one predetermined frequency range, comparing the blade energies to at least one of each other or a predetermined damage threshold, and implementing a control action when one or more of the blade energies vary from each other by a predetermined amount or one or more of the blade energies exceeds the predetermined damage threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
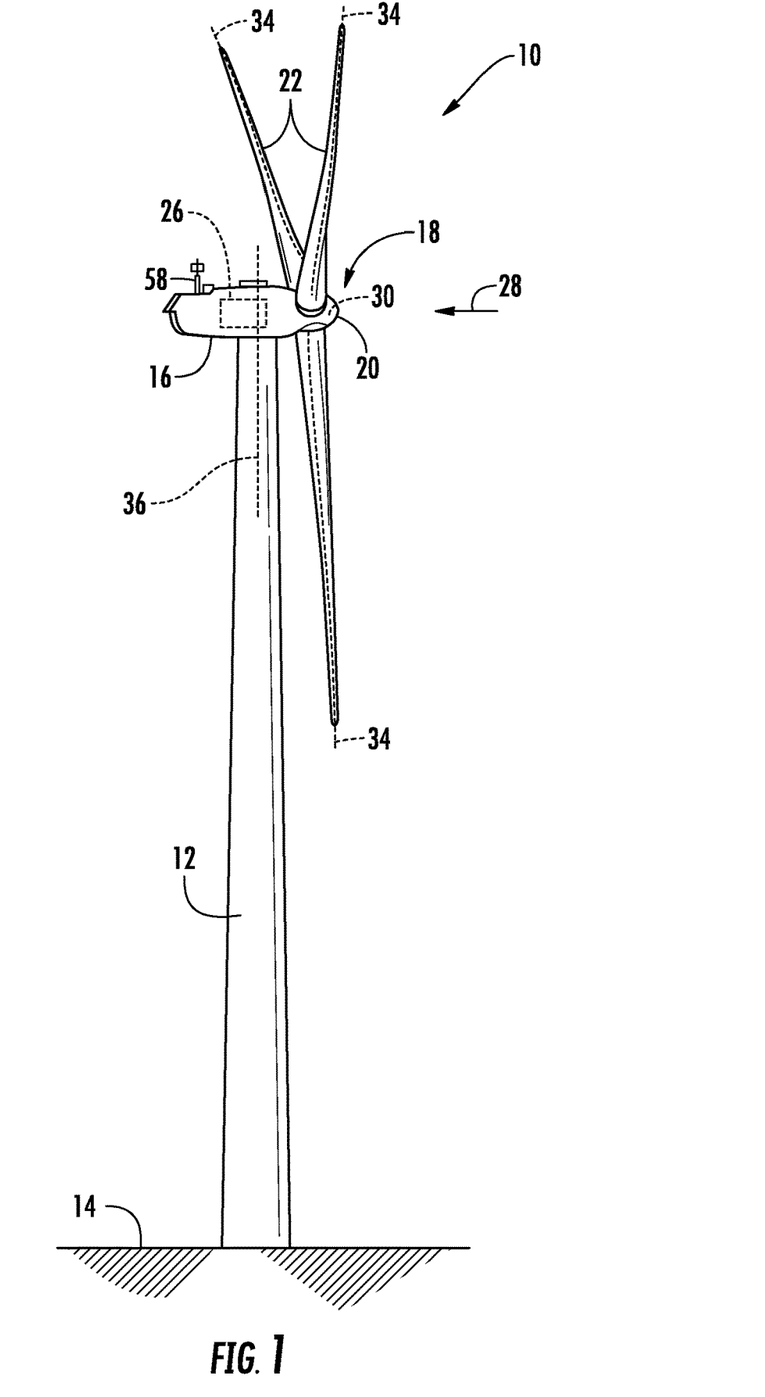
FIG. 1 illustrates a perspective view of a wind turbine according to one embodiment of the present disclosure.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
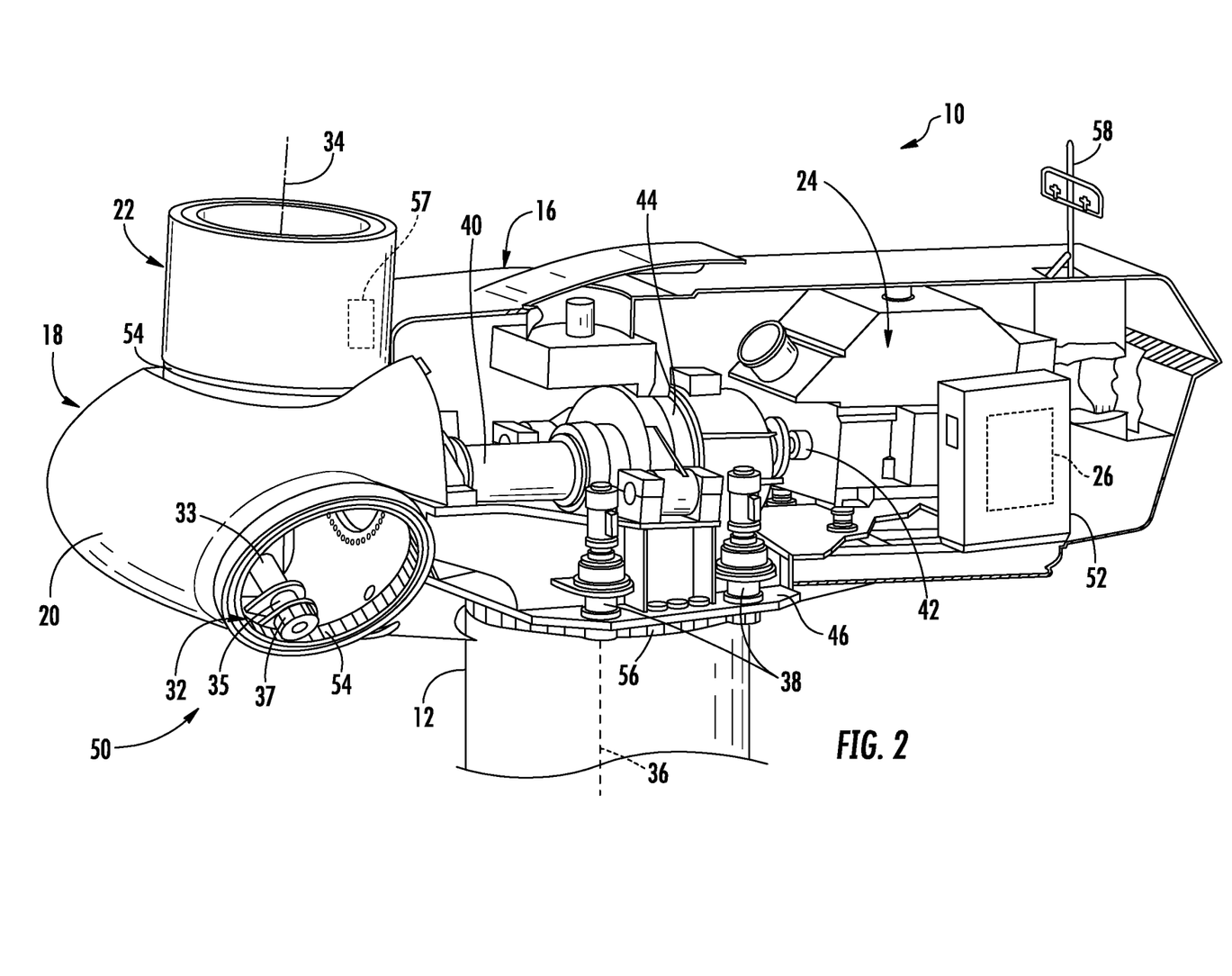
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40.

It should be appreciated that the main shaft 40 may generally be supported within the nacelle 16 by a support frame or bedplate 46 positioned atop the wind turbine tower 12. For example, the main shaft 40 may be supported by the bedplate 46 via a pair of pillow blocks mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

Figure 4:
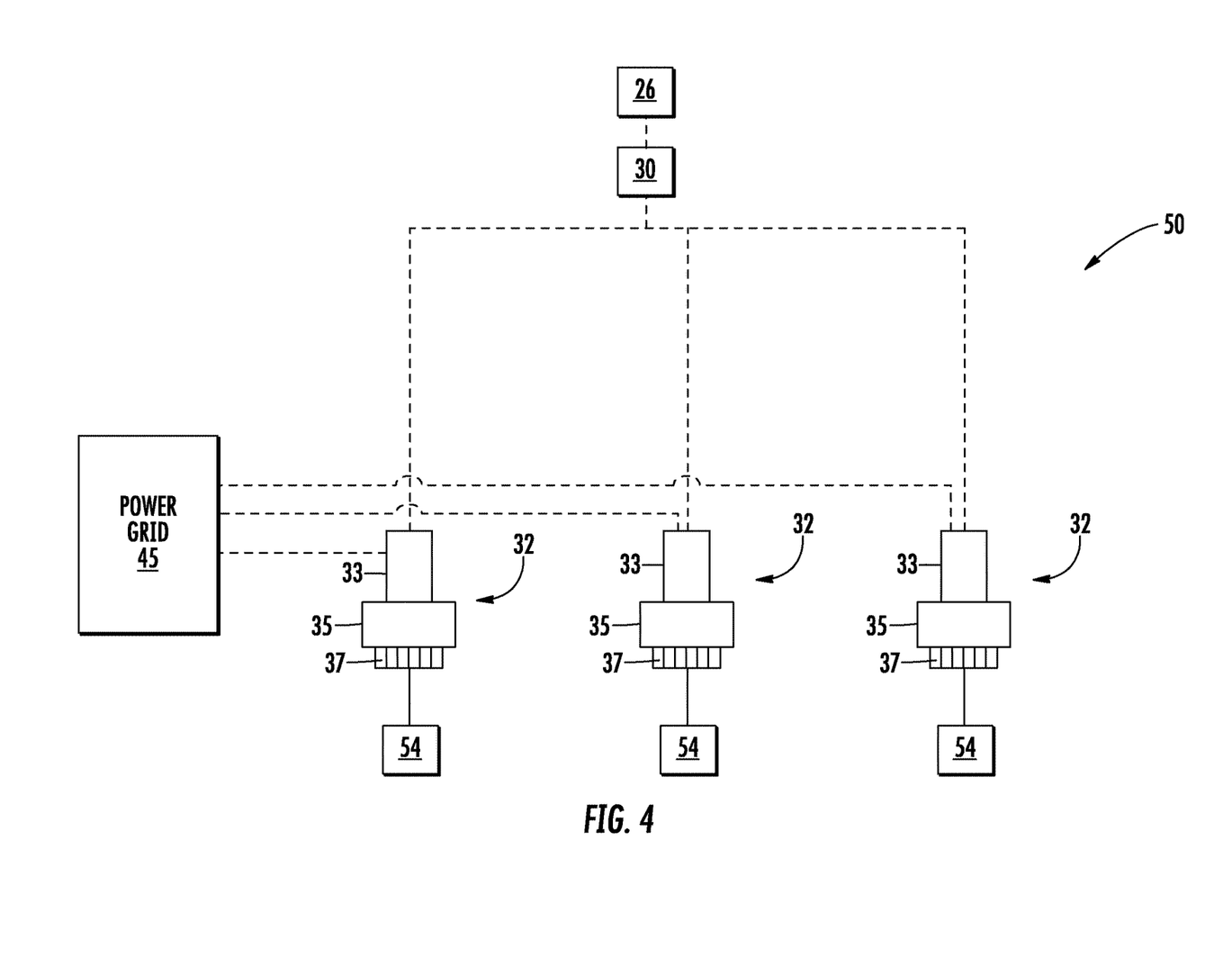
FIG. 4 illustrates a schematic diagram of one embodiment of a pitch system of a wind turbine according to the present disclosure.

As shown in FIGS. 2 and 4, the wind turbine 10 may further a pitch system 50 that includes a pitch adjustment mechanism 32 for each of the rotor blades 22 that is configured to rotate each rotor blade 22 about its pitch axis 34. Further, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 54 coupled between the hub 20 and a corresponding rotor blade 22 such that rotation of the pitch drive pinion 37 causes rotation of the pitch bearing 54. Thus, in such embodiments, rotation of the pitch drive motor 33 drives the pitch drive gearbox 35 and the pitch drive pinion 37, thereby rotating the pitch bearing 54 and the rotor blade 22 about the pitch axis 34. Similarly, the wind turbine 10 may include one or more yaw drive mechanisms 38 communicatively coupled to the controller 26, with each yaw drive mechanism(s) 38 being configured to change the angle of the nacelle 16 relative to the wind (e.g., by engaging a yaw bearing 56 of the wind turbine 10).

Further, as shown, the turbine controller 26 may also be communicatively coupled to each pitch adjustment mechanism 32 of the wind turbine 10 through a separate or integral pitch controller 30 (FIGS. 1 and 4) for controlling and/or altering the pitch angle of each respective rotor blade 22 (i.e., an angle that determines a perspective of the rotor blades 22 with respect to the direction 28 of the wind).

In addition, as shown in FIG. 2, one or more sensors 57, 58 may be provided on the wind turbine 10. More specifically, as shown, a blade sensor 57 may be configured with one or more of the rotor blades 22 to monitor the rotor blades 22. Further, as shown, a wind sensor 58 may be provided on the wind turbine 10. For example, the wind sensor 58 may a wind vane, and anemometer, a LIDAR sensor, or another suitable sensor that measures wind speed and/or direction. As such, the sensors 57, 58 may further be in communication with the controller 26, and may provide related information to the controller 26.

It should also be appreciated that, as used herein, the term "monitor" and variations thereof indicates that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the controller 26 to determine the condition.

Figure 3:
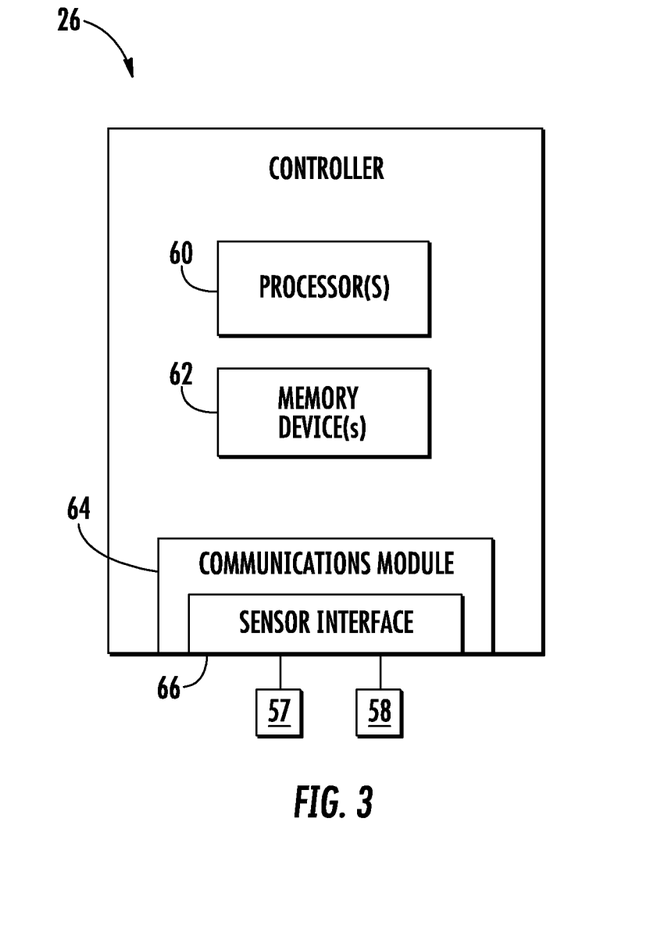
FIG. 3 illustrates a schematic diagram of one embodiment of suitable components that may be included in a wind turbine controller according to the present disclosure.

Referring now to FIG. 3, there is illustrated a block diagram of one embodiment of suitable components that may be included within the controller 26 (or the pitch controller 30) according to the present disclosure. As shown, the controller(s) 26, 30 may include one or more processor (s) 60 and associated memory device(s) 62 configured to perform a variety of computer-implemented functions (e.g., performing the methods, steps, calculations and the like and storing relevant data as disclosed herein). Additionally, the controller(s) 26, 30 may also include a communications module 64 to facilitate communications between the controller(s) 26, 30 and the various components of the wind turbine 10. Further, the communications module 64 may include a sensor interface 66 (e.g., one or more analog-to-digital converters) to permit signals transmitted from one or more sensors 57, 58 to be converted into signals that can be understood and processed by the processors 60. It should be appreciated that the sensors 57, 58 may be communicatively coupled to the communications module 64 using any suitable means. For example, as shown in FIG. 3, the sensors 57, 58 are coupled to the sensor interface 66 via a wired connection. However, in other embodiments, the sensors 57, 58 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller(s) 26, 30 to perform various functions including, but not limited to, transmitting suitable control signals to implement corrective action(s) in response to a distance signal exceeding a predetermined threshold as described herein, as well as various other suitable computer-implemented functions.

Referring now to FIG. 4, a schematic diagram of one embodiment the overall pitch system 50 for the wind turbine 10 is illustrated. More specifically, as shown, the pitch system 50 may include a plurality of pitch drive mechanisms 32, i.e. one for each pitch axis 34. Further, as shown, each of the pitch drive mechanisms may be communicatively coupled to the power grid 45. Thus, during normal operation of the wind turbine 10, the pitch drive motors 33 may be driven by the power grid 45.

Figure 5:
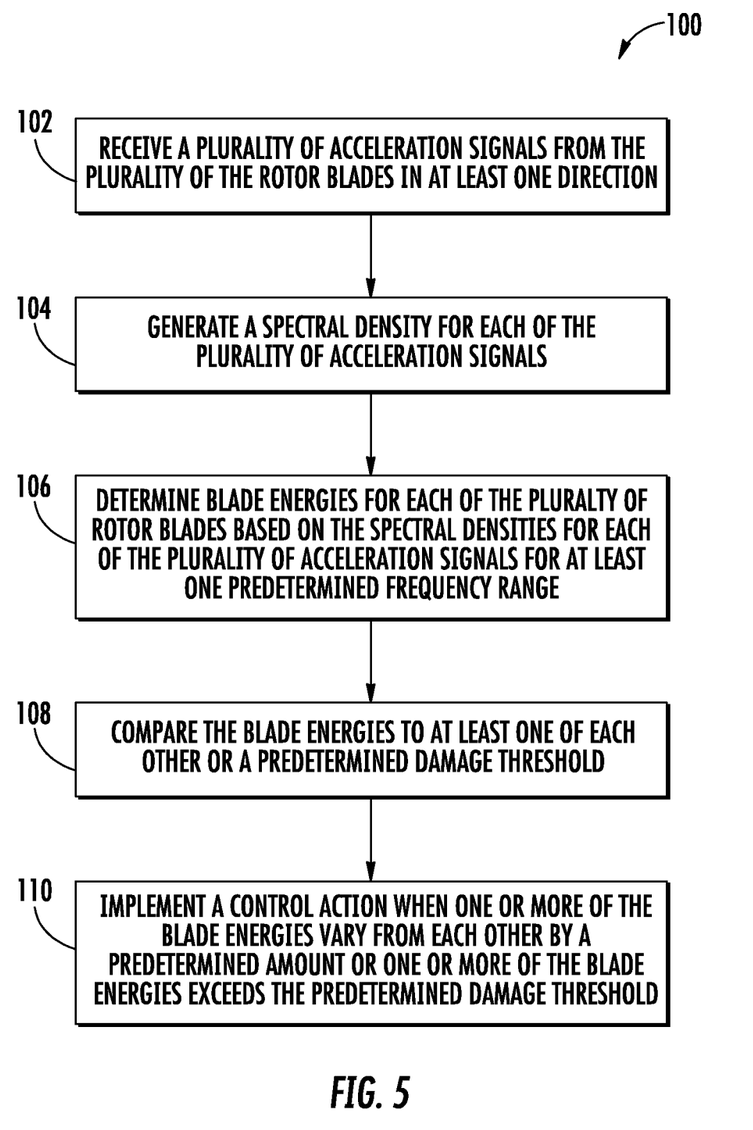
FIG. 5 illustrates a flow diagram of one embodiment of a method for mitigating damage in a rotor blade of a plurality of rotor blades of a wind turbine according to the present disclosure.

More specifically, as shown in FIG. 5, a flow diagram of one embodiment of a method 100 for mitigating damage in a rotor blade of a plurality of rotor blades of a wind turbine is illustrated. The method 100 may be implemented using, for instance, the wind turbine 10 and controller 26, the rotor blades 22, and the pitch system 50 discussed above with reference to FIGS. 1-4. FIG. 5 depicts steps performed in a particular order for purposes of illustration and discussion. Those of ordinary skill in the art, using the disclosures provided herein, will understand that various steps of the method 100 or any of the other methods disclosed herein may be adapted, modified, rearranged, performed simultaneously or modified in various ways without deviating from the scope of the present disclosure.

Figure 6:
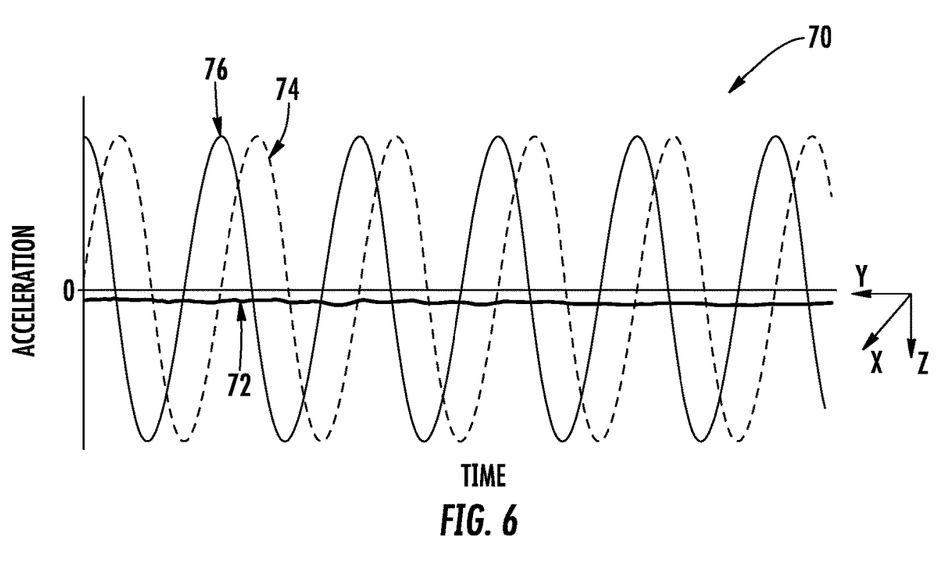
FIG. 6 illustrates a graph of one embodiment of acceleration (y-axis) versus time (x-axis) for a rotor blade according to the present disclosure.

As shown at (102), the method 100 includes receiving a plurality of acceleration signals from the plurality of the rotor blades 22 in at least one direction (e.g. the X-, Y-, and Z-directions in terms of gravity). For example, in one embodiment, the plurality of acceleration signals may be generated by the pitch system 50 of the plurality of rotor blades 22. FIG. 6 illustrates a graph 70 of one embodiment of acceleration (y-axis) versus time (x-axis) for a rotor blade 22 according to the present disclosure. More specifically, as shown, the acceleration signals 72, 72, 76 for one of the rotor blade 22 in the X-, Y-, and Z-directions in terms of gravity are illustrated. Thus, the pitch controller 30 and/or the turbine controller 26 may receive such signals from each of the rotor blades 22 and use the Z-direction acceleration signals 76 from each rotor blade 22 for further processing as described herein. Therefore, by using the Z-direction acceleration signals from each rotor blade 22 (which are generally already collected by the pitch system 50), additional sensors may not be required, thereby simplifying the system described herein.

Referring back to FIG. 5, as shown at (104), the method 100 includes generating a spectral density for each of the plurality of acceleration signals. For example, the spectral density for each of the plurality of acceleration signals may correspond to a power spectral density, which describes the distribution of power into frequency components of each acceleration signal.

As shown at (106), the method 100 includes determining blade energies for each of the plurality of rotor blades 22 based on the power spectral densities for each of the plurality of acceleration signals for at least one predetermined frequency range. For example, in certain embodiments, the controller(s) 26, 30 may determine the power spectral density for each of the acceleration signals using Welch's method. As described herein, Welch's method generally refers to a method for spectral density estimation and encompasses its definition understood by those having ordinary skill in art.

More specifically, in certain embodiments, the controller(s) 26, 30 may determine the blade energies for each of the plurality of rotor blades 22 by determining an area under a curve of the power spectral densities for each of the plurality of acceleration signals for the predetermined frequency range(s). In addition, the controller(s) 26, 30 may determine the predetermined frequency range(s) based on a power output of the wind turbine 10, rotor blade type/manufacturer, wind turbine type/manufacturer, and/or an angle of one or more of the plurality of rotor blades 22.

In yet another embodiment, the controller(s) 26, 30 may determine a plurality of predetermined frequency ranges. For example, in such embodiments, the plurality of predetermined frequency ranges may include a first frequency range of from about 25 Hertz (Hz) to about 30 Hz and a second frequency range from about 35 Hz to about 40 Hz.

In such embodiments, the controller(s) 26, 30 may determine the area under the curve of the power spectral densities for each of the acceleration signals by determining the area under the curve of the power spectral densities for a logarithm of each of the acceleration signals. In particular embodiments, the controller(s) 26, 30 may determine the area under the curve of the power spectral densities for the logarithm of each of the acceleration signals using Simpson's rule. As described herein, Simpson's rule generally refers to a method for numerical integration and encompasses its definition understood by those having ordinary skill in art.

In certain embodiments, the controller(s) 26, 30 may determine the blade energies for each of the plurality of rotor blades 22 based on the power spectral densities for each of the acceleration signals for at least one predetermined frequency range by determining a maximum value and a minimum value of the area under the curve of the power spectral densities for each of the acceleration signals and determining a difference between the maximum value and the minimum value for each of the acceleration signals.

Referring back to FIG. 5, as shown at (108), the method 100 includes comparing the blade energies to each other and/or to a predetermined damage threshold. In certain embodiments, as the power output increases, the predetermined damage threshold may also increase. In such embodiments, for example, the controller(s) 26, 30 may compare each of the differences between the maximum value and the minimum value for each of the acceleration signals to each other and/or to a predetermined damage threshold.

In further embodiments, the method 100 may include determining the area under the curve of the spectral densities for each of the plurality of acceleration signals for the predetermined frequency range for a training time period so as to determine a healthy blade threshold as a baseline for each of the plurality of rotor blades 22. For example, comparison of blade energy (e.g. the area under the curve for a frequency range) for one blade to another allows for immediate detection of blade damage. However, using the rotor blade's area under the curve for a learned frequency ranges may also show anomalies over time. As such, if the blade energy for that frequency range increases over time, it is likely damage that damage to that particular rotor blade has occurred. This analysis may start by using the training time period where the rotor blade is determined as healthy as a baseline. In cases where damage on multiple blades occurs, the comparison over time may be important to capture such damage events.

Figure 7:
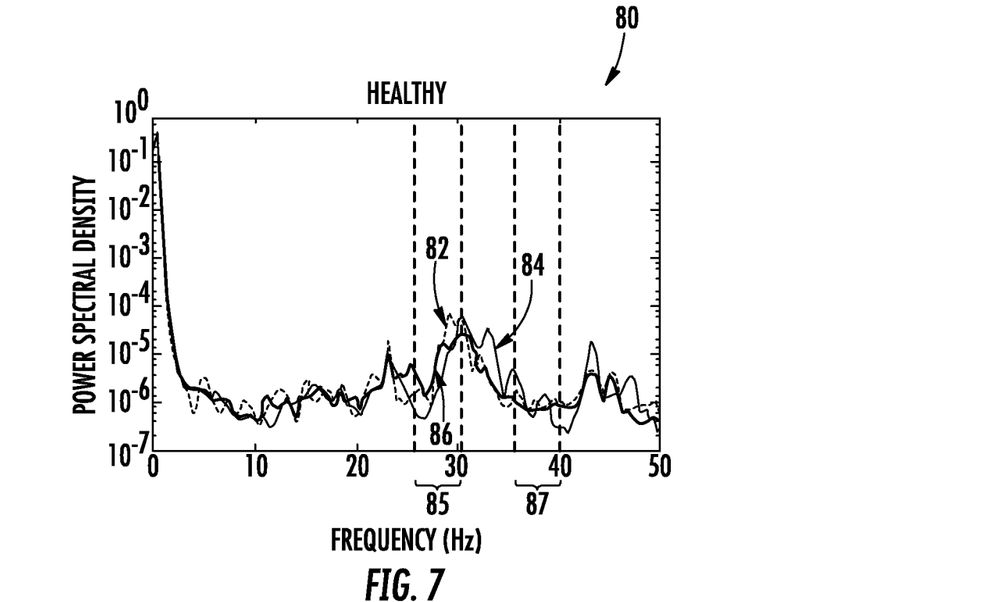
FIG. 7 illustrates a graph of power spectral density (y-axis) versus frequency (x-axis) for a wind turbine having healthy rotor blades according to the present disclosure.
Figure 8:
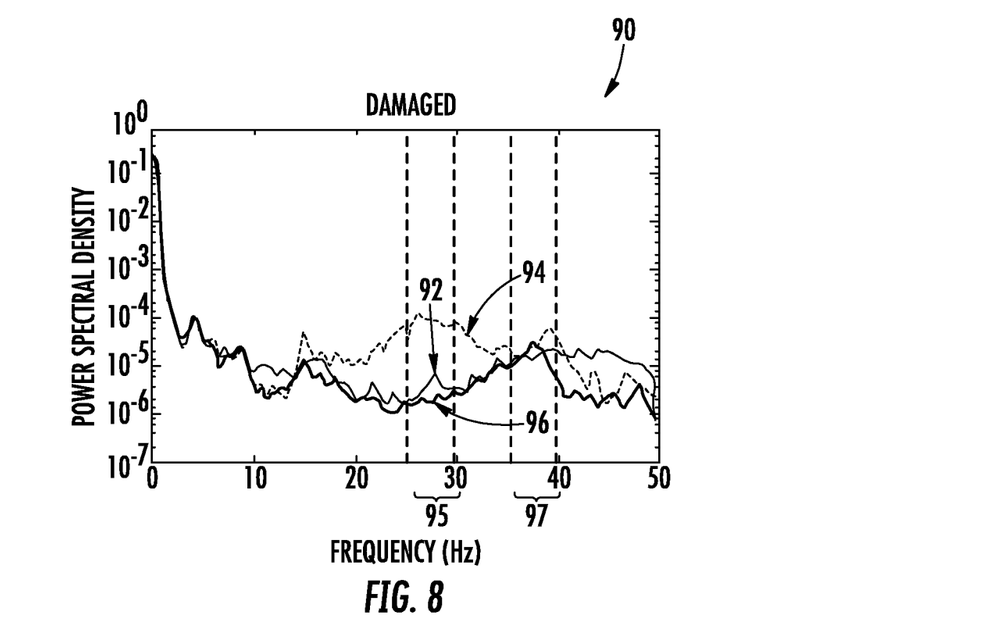
FIG. 8 illustrates a graph of power spectral density (y-axis) versus frequency (x-axis) for a wind turbine having at least one unhealthy rotor blade according to the present disclosure.

Blade energy detection methods according to the present disclosure can be better understood with reference to FIGS. 7 and 8. As shown, FIG. 7 illustrates a graph 80 of power spectral density (y-axis) versus frequency (x-axis) for a wind turbine having healthy rotor blades according to the present disclosure, whereas FIG. 8 illustrates a graph 90 of power spectral density (y-axis) versus frequency (x-axis) for an unhealthy rotor blade according to the present disclosure. More particularly, FIG. 7 highlights two example first and second predetermined frequency ranges 85, 87, wherein, within the two predetermined frequency ranges 85, 87, the logarithm of the power spectral densities 82, 84, 86 for the three rotor blades 22 (e.g. the area under the curve of each of the three rotor blades 22) is approximately equal. In contrast, FIG. 8 highlights two example first and second predetermined frequency ranges 95, 97, wherein, within the first predetermined frequency range 95, the logarithm of the power spectral density 94 for one of the rotor blades 22 is greater than the power spectral densities 92, 96 for the other two rotor blades 22 (e.g. the area under the curve of each of the three rotor blades 22).

Referring back to FIG. 5, as shown at (110), the method 100 may include implementing a control action when one or more of the blade energies vary from each other by a predetermined amount or one or more of the blade energies exceed the predetermined damage threshold. For example, in particular embodiments, the control action may include, for example, generating an alarm or notification signal, shutting down the wind turbine, and/or derating the wind turbine 10. As such, a maintenance and/or repair action may be performed on the damaged rotor blade as needed.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for mitigating damage in a rotor blade of a plurality of rotor blades of a wind turbine, the method comprising:
   receiving, via a controller, a plurality of acceleration signals from the plurality of the rotor blades in at least one direction;
   generating, via the controller, a spectral density for each of the plurality of acceleration signals;
   determining, via the controller, blade energies for each of the plurality of rotor blades based on the spectral densities for each of the plurality of acceleration signals for at least one predetermined frequency range;
   comparing the blade energies to at least one of each other or a predetermined damage threshold; and,
   implementing a control action when one or more of the blade energies vary from each other by a predetermined amount or one or more of the blade energies exceed the predetermined damage threshold.

2. The method of claim 1, wherein the plurality of acceleration signals is generated by respective pitch systems of the plurality of rotor blades.

3. The method of claim 1, wherein the at least one direction comprises a Z-direction in terms of gravity.

4. The method of claim 1, further comprising determining the at least one predetermined frequency range based on a power output of the wind turbine, rotor blade type, wind turbine type, and/or an angle of one or more of the plurality of rotor blades, wherein as the power output increases, the predetermined damage threshold increases.

5. The method of claim 1, wherein determining the blade energies for each of the plurality of rotor blades further comprises determining an area under a curve of the spectral densities for each of the plurality of acceleration signals for the at least one predetermined frequency range.

6. The method of claim 5, wherein the at least one predetermined frequency range comprises a plurality of predetermined frequency ranges.

7. The method of claim 6, wherein the plurality of predetermined frequency ranges comprises from about 25 Hertz (Hz) to about 30 Hz or from about 35 Hz to about 40 Hz.

8. The method of claim 6, wherein determining the area under the curve of the spectral densities for each of the plurality of acceleration signals for the plurality of predetermined frequency ranges further comprises determining the area under the curve of the spectral densities for a logarithm of each of the plurality of acceleration signals for the plurality of predetermined frequency ranges.

9. The method of claim 8, further comprising determining the area under the curve of the spectral densities for the logarithm of each of the plurality of acceleration signals for the plurality of predetermined frequency ranges using Simpson's rule.

10. The method of claim 5, further comprising determining the area under the curve of the spectral densities for each of the plurality of acceleration signals for the predetermined frequency range for a training time period so as to determine a healthy blade threshold as a baseline for each of the plurality of rotor blades.

11. The method of claim 5, wherein determining the blade energies for each of the plurality of rotor blades based on the spectral densities for each of the plurality of acceleration signals for at least one predetermined frequency range further comprises:
   determining a maximum value and a minimum value of the area under the curve of the spectral densities for each of the plurality of acceleration signals for the at least one predetermined frequency range; and,
   determining a difference between the maximum value and the minimum value for each of the plurality of acceleration signals.

12. The method of claim 11, wherein comparing the blade energies to at least one of each other or a predetermined damage threshold further comprises comparing each of the differences between the maximum value and the minimum value for each of the plurality of acceleration signals to the predetermined damage threshold.

13. The method of claim 5, wherein the spectral density for each of the plurality of acceleration signals comprises a power spectral density.

14. The method of claim 13, wherein determining the power spectral density for each of the plurality of acceleration signals further comprises utilizing Welch's method.

15. The method of claim 1, wherein the control action comprises at least one of generating an alarm or notification signal, shutting down the wind turbine, and/or derating the wind turbine.

16. A system for mitigating damage in a rotor blade of a plurality of rotor blades of a wind turbine, the system comprising:
   a pitch system communicatively coupled to each of the plurality of rotor blades, each of the pitch systems generating a plurality of acceleration signals; and,
   a controller comprising at least one processor, the at least one processor performing a plurality of operations, the plurality of operations comprising:
      receiving the plurality of acceleration signals from the pitch systems;
      determining blade energies for each of the plurality of rotor blades based the plurality of acceleration signals for at least one predetermined frequency range;
      comparing the blade energies to at least one of each other or a predetermined damage threshold; and,
      implementing a control action when one or more of the blade energies vary from each other by a predetermined amount or one or more of the blade energies exceed the predetermined damage threshold.

17. The system of claim 16, further comprising determining the at least one predetermined frequency range based on a power output of the wind turbine, rotor blade type, wind turbine type, and/or an angle of one or more of the plurality of rotor blades, wherein as the power output increases, the predetermined damage threshold increases.

18. The system of claim 16, wherein the plurality of operations further comprises generating a power spectral density for each of the plurality of acceleration signals.

19. The system of claim 18, wherein determining the blade energies for each of the plurality of rotor blades further comprises determining an area under a curve of the power spectral densities for each of the plurality of acceleration signals for the at least one predetermined frequency range.

20. The system of claim 19, wherein determining the blade energies for each of the plurality of rotor blades based on the power spectral densities for each of the plurality of acceleration signals for at least one predetermined frequency range further comprises:

determining a maximum value and a minimum value of the area under the curve of the spectral densities for each of the plurality of acceleration signals for the at least one predetermined frequency range;

determining a difference between the maximum value and the minimum value for each of the plurality of acceleration signals; and, comparing each of the differences between the maximum value and the minimum value for each of the plurality of acceleration signals to the predetermined damage threshold.

* * * * *